United States Patent [19]

Lauring et al.

[11] Patent Number: 5,555,774
[45] Date of Patent: Sep. 17, 1996

[54] CONTROL PEDAL EFFORT REDUCTION AND RETURN ASSIST

[75] Inventors: Daniel H. Lauring, Huntington Woods; Ronald A. Smith, Milford; Ralph P. Gesell, Dearborn, all of Mich.

[73] Assignee: Ford Motor Company, Dearborn, Mich.

[21] Appl. No.: 399,260

[22] Filed: Mar. 6, 1995

[51] Int. Cl.⁶ .............................. B60K 23/02; G05G 1/14; G05G 7/04
[52] U.S. Cl. ................................. 74/512; 74/560
[58] Field of Search ....................... 74/512–560; 267/163

[56]    References Cited
U.S. PATENT DOCUMENTS

| 2,869,392 | 1/1959 | Muller . |
| 3,199,367 | 8/1965 | Zetye . |
| 3,774,471 | 11/1973 | Pezza . |
| 4,700,817 | 10/1987 | Kondo et al. . |
| 4,800,774 | 1/1989 | Hagiwara et al. ................. 74/560 X |
| 4,907,468 | 3/1990 | Hagiwara et al. . |
| 5,213,314 | 5/1993 | Kano et al. ........................ 267/163 |

FOREIGN PATENT DOCUMENTS

| 1181194 | 6/1959 | France . |
| 1931356 | 12/1970 | Germany . |
| 58-6629 | 1/1983 | Japan ............................. 74/560 |
| 218428 | 12/1983 | Japan ............................. 74/560 |

Primary Examiner—Charles A. Marmor
Assistant Examiner—Mary Ann Battista
Attorney, Agent, or Firm—Frank G. McKenzie

[57]    ABSTRACT

A control pedal, supported rotatably on a shaft located in the passenger compartment of a motor vehicle, is biased by a spring toward a free state position against a stop and is biased in the opposite rotary direction by a spring to assist the vehicle operator's effort in depressing the pedal. The spring, having a U-shaped cross section, includes outwardly extending legs that seat within recesses formed at one lateral side on the clutch pedal and at the opposite lateral side near a dash panel.

3 Claims, 2 Drawing Sheets

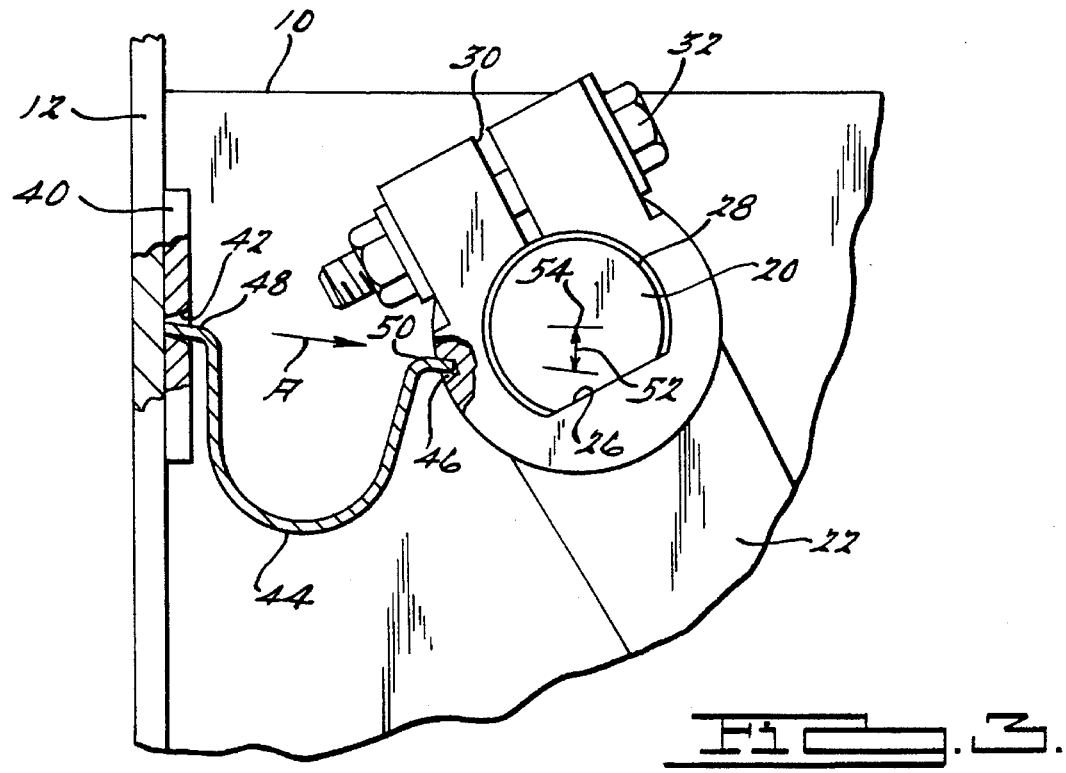
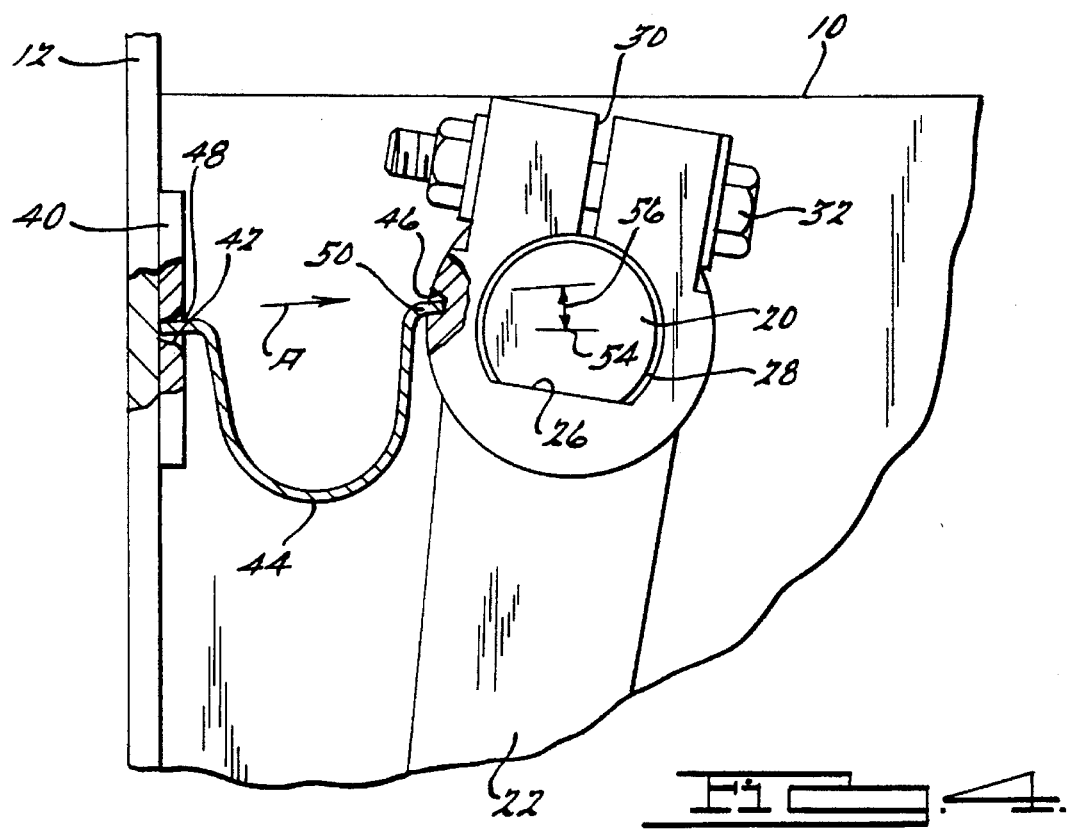

CONTROL PEDAL EFFORT REDUCTION AND RETURN ASSIST

BACKGROUND OF THE INVENTION

1. Field of the Invention

This invention relates to a control pedal for use in a motor vehicle. More particularly, the invention pertains an apparatus for reducing effort to depress a clutch pedal and to restore the pedal to its undepressed position.

2. Description of the Prior Art

The level of effort required to depress the control pedals of a motor vehicles, especially those for heavy trucks, is high due to the large spring force present in the clutch that drivably connects and releases the engine crankshaft and transmission input shaft.

In a convention clutch pedal, a torsional coiled spring is used to return the clutch pedal to its normal position. An alternate technique is to employ two coil springs, each spring attached to a lever arm fixed to the clutch pedal. One spring develops a force that urges the pedal arm to return to its initial position, the second spring urges the pedal arm in a depressed direction. If a torsional coil spring having a larger spring constant or a longer lever is used to reduce the pedal effort, then the force developed by the spring acting on the pedal arm is increased, requiring greater effort in the initial stage of pedal operation. An example of a device performing this function is described in U.S. Pat. No. 4,907,468.

SUMMARY OF THE INVENTION

It is an object of this invention to provide a mechanism that reduces the effort necessary to operate a control pedal for a motor vehicle and returns the pedal to its normal position.

The spring mechanism of the present invention occupies a small space, is located within the passenger compartment out of a corrosive environment, and is particularly easy to assemble. The spring lowers the effort required to depress the pedal near the full extremity of its travel.

In realizing these advantages and objectives, the present invention for operating a control pedal between depressed and undepressed positions includes a pedal arm supported for pivoting movement about an axis, a retainer fixed against displacement, a spring formed of thin sheet having a U-shaped cross sectional body portion, a first leg secured on the retainer against displacement relative to the retainer, and a second leg secured on the pedal arm against displacement relative to the pedal arm, the spring developing a force due to resilient flexure of the body portion as the pedal is pivoted, the spring force being applied to the pedal arm and directed with respect to the pivot axis to assist depression of the pedal arm and to restore the pedal arm to its undepressed position.

The device is installed in a motor vehicle having a retainer fixed against displacement and a spring formed of thin sheet having a U-shaped cross sectional body portion, a first leg and a second leg extending laterally from the body portion, by the steps of supporting a pedal arm for pivoting movement about an axis, securing the first leg on the retainer against displacement relative to the retainer, securing the second leg on the pedal arm against displacement relative to the pedal arm, depressing the pedal, and installing a stop to limit rotation of the pedal arm about the axis.

BRIEF DESCRIPTION OF THE DRAWINGS

FIG. 3 is a detailed view from the side showing the clutch pedal in the undepressed position.

FIG. 4 is a side view showing the clutch pedal and spring in the depressed position.

DESCRIPTION OF THE PREFERRED EMBODIMENT

Figure 1:
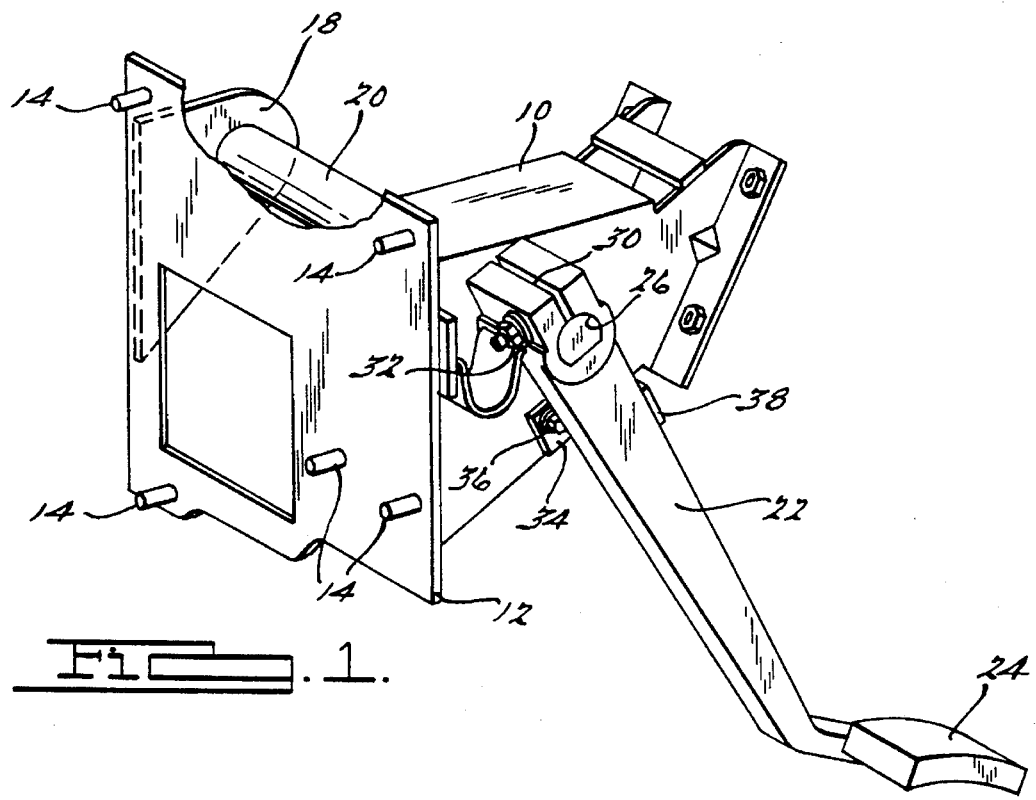
FIG. 1 is an isometric projection showing a clutch pedal assembly according to this invention and the structure that supports it.
Figure 2:
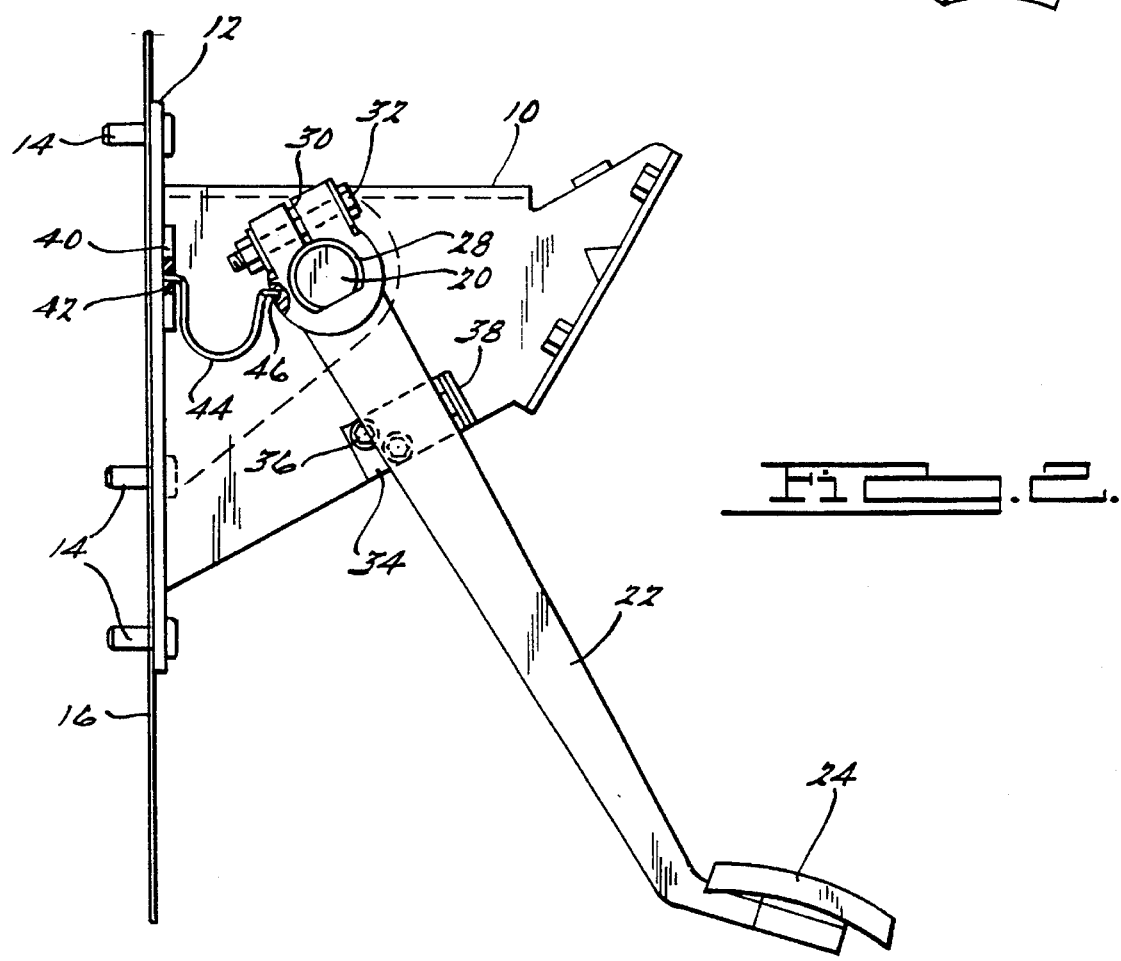
FIG. 2 is a side view of the assembly shown in FIG. 1.

Referring first to FIGS. 1 and 2, a steering and clutch support bracket 10 includes a plate 12 connected by bolts 14 to a dashboard 16, which is fixed against displacement and is located near the floor of the passenger compartment of a motor vehicle.

A flange 18 fixed to the inner surface of plate 12 rotatably supports a pedal shaft 20, which supports a clutch pedal 22 for pivotal movement about the axis of shaft 20. The clutch pedal extends downward and inward from shaft 20 and supports a pedal plate 24 in the form of a rubber pad 24, which is contacted by the driver's foot.

The upper end of clutch pedal 22 includes a D-shaped hole 26, within which a pedal shaft bushing 28 is located. The pedal shaft 20 has a D-shaped cross section compatible with the cross section of hole 20 so that the pedal shaft is keyed on the clutch pedal to prevent relative rotation. At the upper extremity of the clutch pedal, a radially directed slot 30 is partially closed by a clamping bolt 32 so that the clutch pedal is fixed against displacement relative to pedal shaft 20.

A bracket 34, connected by bolts 36 to a lateral side of the steering clutch and support bracket 10, provides an outwardly extending leg 38 located adjacent to and adapted for contact with the clutch pedal arm 22, thereby providing a stop or limit to counterclockwise rotation of the clutch pedal to its undepressed position, the position shown in FIGS. 1 and 2.

A spring retainer 40, spot welded or screwed to the inner surface of plate 12, provides a recess 42 adapted to receive the end of clutch support spring 44. The clutch pedal is formed with a similar recess 46, which is located and sized to receive an end of spring 44.

FIG. 3 shows the clutch pedal resting against stop 38, and FIG. 4 shows the clutch pedal depressed and rotated clockwise about the axis of shaft 20.

Preferably, the spring is formed of spring steel and may be approximately 20 mm wide in the U-portion and tapers to approximately 15 mm in the leg portions 42, 46. Spring 44 has a U-shaped cross section, a first outwardly extending leg 48 located within recess 42, and a second outwardly extending leg 50 located within recess 46. The force developed by the spring, represented by vector A in FIG. 3, acts in a line between points of contact of legs 48–50 in recesses 42, 46. The line of action of the spring force A is offset by distance 52 from the axis 54 of the pedal shaft 20, thereby applying to the clutch pedal 22 a restoring moment directed counterclockwise about axis 54, the movement tending to return the clutch pedal to a position where it contacts stop 38.

When the pedal is depressed, as shown in FIG. 4, the spring develops a force A whose line of action is offset by dimension 56 from the axis 54 of shaft 20, thereby applying to the clutch pedal 22 a clockwise moment about axis 54, tending to add to a clockwise movement about axis 54 produced by the force applied by the driver's foot to pedal plate 24.

The arrangement of FIGS. 3 and 4 shows that the spring 44 both operates to assist depression of the clutch pedal 22 and to restore the clutch pedal to its undepressed resting position against stop 38, depending upon the extent to which the clutch pedal is moved from the position against the stop.

Spring 44 is installed in the assembly shown in FIGS. 1 and 2 by simply locating legs 48, 50 of the spring in the respective recesses 42, 46. Then, the clutch pedal is depressed, and bracket 34 is installed in its proper location by tightening bolts 36 into engagement with threads provided on bracket 10. Finally, the pedal is released and allowed to rotate counterclockwise into contact with the pedal stop 38.

Although the preferred embodiment of the present invention has been disclosed and described in detail, further modifications, enhancements, and embodiments are contemplated to be within the spirit and scope of the present invention and the following claims.

We claim:

1. A device for operating a control pedal, comprising:

a pedal arm supported for pivoting movement about an axis;

a retainer fixed against displacement;

a spring formed of thin sheet having a U-shaped cross sectional body portion, a first leg secured on the retainer against displacement relative to the retainer, and a second leg secured on the pedal arm against displacement relative to the pedal arm, the spring developing a force due to resilient flexure of the body portion as the pedal arm is pivoted, the spring force being applied to the pedal arm and directed with respect to the axis to assist depression of the pedal arm to a depressed position and to restore the pedal arm to an undepressed position, wherein the pedal arm is formed with a first recess facing the retainer, the first recess adapted to receive the second leg therein, the retainer formed with a second recess facing the first recess, the second recess adapted to receive the first leg therein.

2. The device of claim 1, further comprising a stop fixed against displacement, located for contact with the pedal arm, and limiting rotation of the pedal arm about the axis.

3. The device of claim 1, wherein:

when the pedal arm is in said undepressed position, the second recess is located below the axis, and the spring applies a moment to the pedal arm about the axis tending to restore the pedal arm to said undepressed position; and when the pedal arm is in said depressed position, the second recess is located above the axis, and the spring applies a moment to the pedal arm about the axis tending to depress the pedal arm.

\* \* \* \* \*